E. C. SCHMIDT & A. U. SMITH.
SEED TESTER.
APPLICATION FILED NOV. 9, 1912.

1,067,556.

Patented July 15, 1913.

2 SHEETS—SHEET 1.

Witnesses
T. Aonoyama.
C. E. Bruckon

Inventors
Alvin U. Smith
Ernest C. Schmidt
By Jerry A. Mathews
Attorney

E. C. SCHMIDT & A. U. SMITH.
SEED TESTER.
APPLICATION FILED NOV. 9, 1912.
1,067,556.
Patented July 15, 1913.
2 SHEETS—SHEET 2.
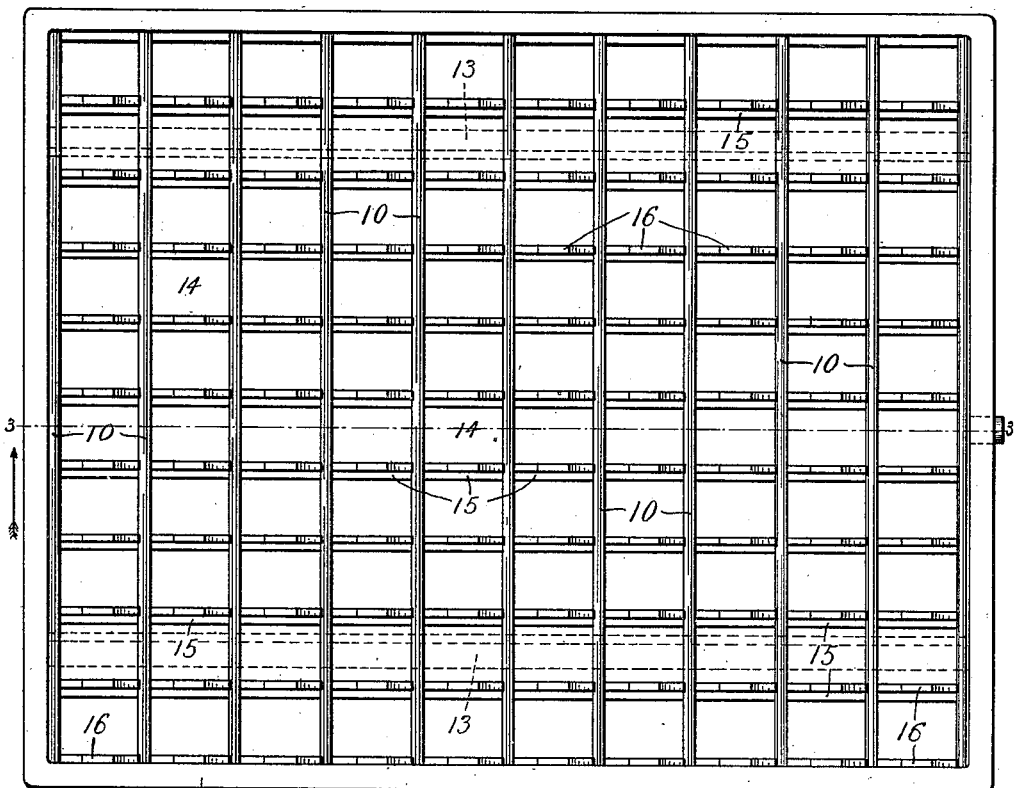
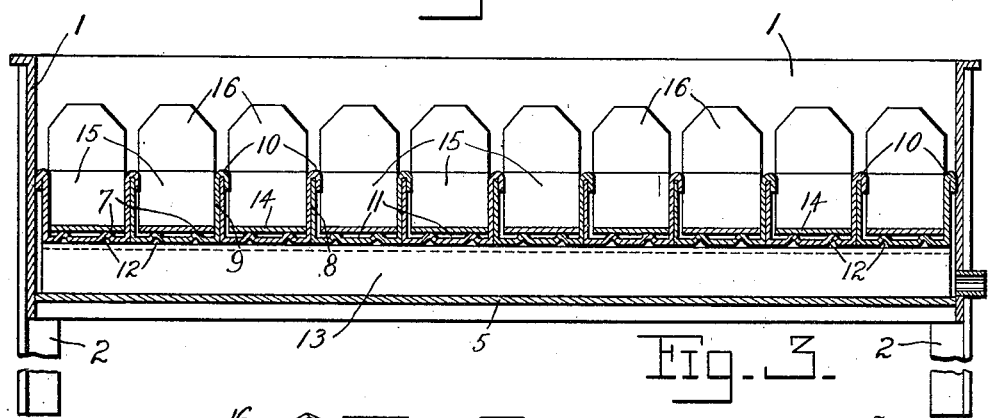
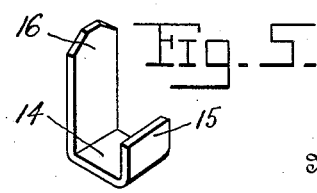
Witnesses
T. Sonoyama
C. E. Breckons
Inventors
Alvin U. Smith
Ernest C. Schmidt
By Jerry A. Mathews
Attorney

UNITED STATES PATENT OFFICE.

ERNEST C. SCHMIDT AND ALVIN U. SMITH, OF BONESTEEL, SOUTH DAKOTA.

SEED-TESTER.

1,067,556. Specification of Letters Patent. Patented July 15, 1913.

Application filed November 9, 1912. Serial No. 730,320.

*To all whom it may concern:*

Be it known that we, ERNEST C. SCHMIDT and ALVIN U. SMITH, citizens of the United States, residing at Bonesteel, in the county of Gregory and State of South Dakota, have invented certain new and useful Improvements in Seed-Testers, of which the following is a specification.

The present invention relates to seed testers, and has for its purpose to provide a device of that character wherein the seeds to be tested are subjected to more uniform heat to the end of testing all of the seeds equally within a given period, and wherein the seeds are held in a plurality of independent receptacles or transferable cups.

The invention has for its further purpose to provide an apparatus which is simple in construction to the end that the same may not require experience to use, and one wherein the cost of manufacture will be substantially little.

Figure 1:
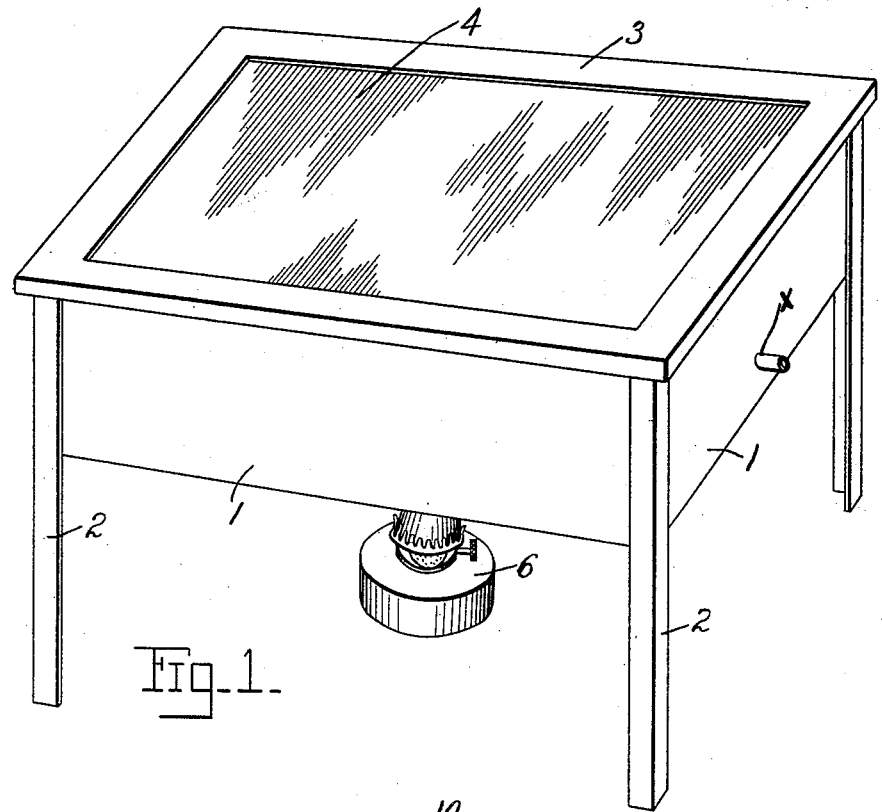
Figure 4:
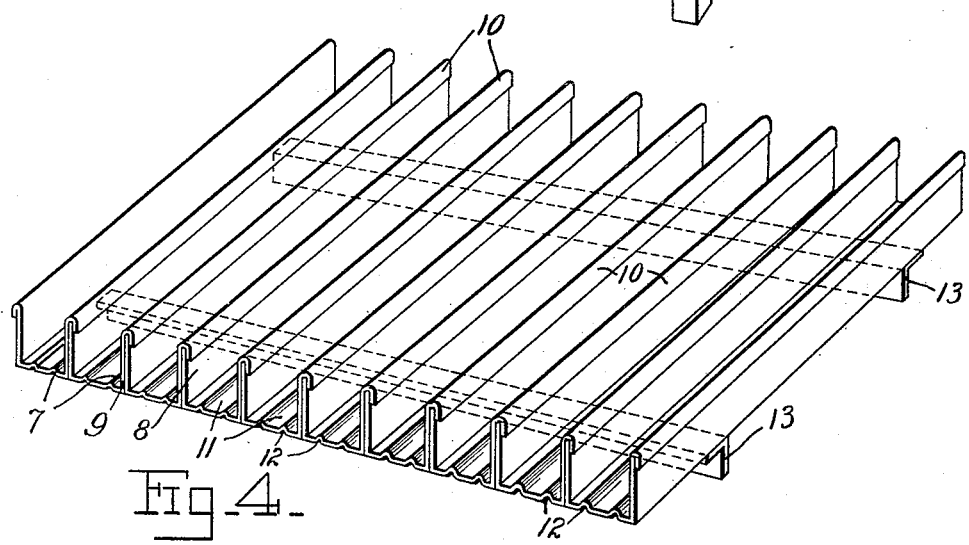

With these and other objects in view the invention consists in the arrangement and combination of parts hereinafter claimed, and, while the invention is not restricted to the exact details shown and described, still, for the purpose of disclosure, reference is had to the accompanying drawings, in which like reference characters designate the same parts in the several views, and in which, Figure 1 is a perspective view of the invention complete; Fig. 2 is a top plan view, with the cover removed; Fig. 3 is a transverse sectional view of Fig. 2, taken on the line 3—3 thereof; Fig. 4 is a perspective view of the seed holding tray; and Fig. 5 is a detail perspective view of one of the seed holding cups.

Referring to the construction in detail, the same consists of a suitable receptacle 1, constructed preferably of sheet metal and which is supported at the four corners thereof by legs 2 of angle iron construction, as shown in Figs. 1 and 3. The receptacle 1 is provided with a removable cover or top 3 having a glass panel 4, which permits of the operation within the apparatus being easily seen, as will be understood. Beneath the bottom 5 of the receptacle is located a suitable lamp or other heater 6, as shown in Fig. 1.

The seed supporting tray shown in Figs. 3 and 4 consists of a plurality of trough-like sections 7 having each a side 8 terminating with a straight edge and a side 9 terminating with a curved edge 10, which embraces the straight edge of the side of the next adjacent trough. In this manner, the several trays, of which there are ten in the present construction, are assembled. The bottom 11 of each tray is provided with a pair of longitudinally-disposed grooves or ridges 12, the purpose whereof being to provide spacing members for a purpose to be presently described. Said ridges do furthermore serve as reinforcing elements for the trays, as will be apparent. The several trays are secured in their assembled relation through the medium of a pair of angle bars or strips 13, after that manner illustrated in Fig. 4, and said members 13 provide the necessary supporting means for holding the tray the required distance from the bottom 5 of the receptacle.

The seed holding cups, which are associated with the several troughs of the tray for holding the individual seeds or groups of seeds, consists each of an angle piece 14 (see Fig. 5) having a short upturned side 15 and a similar but relatively larger side 16, which serves as a handle. The several cups 14, of which there are ten for each trough, are arranged therein as shown in Fig. 2, *i. e.*, the short side 15 being disposed immediately adjacent the handle 16 of the next adjacent cup. There are, therefore, one hundred of these cups used in the apparatus, as disclosed herein. The trough ridges 12 serve to keep the cups 14 spaced from the bottoms of the troughs, as shown clearly in Fig. 3, and these spaces are adapted to permit of the flow of a thin film of water therethrough, which water is caused to flow through the heat imparted by the lamp 6, as will be understood. A drainage pipe is indicated by the reference character X.

The advantages of the construction shown herein may be briefly summarized as follows: The water placed in the heater is adapted to be contained therein until the test is completed. Since the heat is maintained by a lamp, and may be kept uniform, the temperature of the room need not be considered. The provision of the removable or transferable cups enables the testing operation to be easily watched and irregularities corrected. The provision of the cups also avoids the requirement of having the seeds in any particular position.

The invention contemplates the use of a thermometer whereby the temperature condition in the receptacle may be ascertained when convenient.

It is obvious that those skilled in the art may vary the details of construction and arrangement of parts, without departing from the spirit of our invention, and therefore we do not wish to be limited to such features, except as may be required by the claim.

Having thus described our invention, what we claim as new and desire to secure by Letters Patent, is:—

In a seed tester, the combination of a receptacle constructed of sheet metal and adapted to contain heated water; a tray comprising a plurality of metallic troughs, each of said troughs having a side with a straight edge and a side with a turned edge, the turned edge of one trough engaging the straight edge of the next adjacent trough; a pair of angle bars located beneath the several troughs of the tray and supporting the tray spaced from the bottom of the receptacle; and a plurality of seed holding cups located within each of said troughs, each of said cups consisting of a metallic piece having a short upturned side and a relatively higher upturned side forming a handle, substantially as described.

In testimony whereof we affix our signature in presence of two witnesses.

ERNEST C. SCHMIDT.
ALVIN U. SMITH.

Witnesses:
J. H. CROOK,
J. B. CASH.

Copies of this patent may be obtained for five cents each, by addressing the "Commissioner of Patents, Washington, D. C."